US007706581B2

United States Patent
Drews et al.

(10) Patent No.: US 7,706,581 B2
(45) Date of Patent: Apr. 27, 2010

(54) FINGERPRINT DETECTION USING SWEEP-TYPE IMAGER WITH OPTOELECTRONIC SPEED SENSOR

(75) Inventors: Steffen Drews, Hamburg (DE); Rene Duijve, Eindhoven (NL); Thomas Hase, Buchholz (DE); Karl-Ragmar Riemschneider, Hamburg (DE)

(73) Assignee: NXP B.V., Eindhoven (NL)

( * ) Notice: Subject to any disclaimer, the term of this patent is extended or adjusted under 35 U.S.C. 154(b) by 431 days.

(21) Appl. No.: 10/571,157

(22) PCT Filed: Aug. 30, 2004

(86) PCT No.: PCT/IB2004/051600

§ 371 (c)(1),
(2), (4) Date: Mar. 8, 2006

(87) PCT Pub. No.: WO2005/024706

PCT Pub. Date: Mar. 17, 2005

(65) Prior Publication Data
US 2007/0086629 A1    Apr. 19, 2007

(30) Foreign Application Priority Data
Sep. 11, 2003  (EP)  ............................ 03103357

(51) Int. Cl.
*G06K 9/00*  (2006.01)
(52) U.S. Cl. .................. 382/124; 382/100; 382/115; 382/120; 382/122; 382/125
(58) Field of Classification Search ............... 382/100, 382/115, 120, 122, 126, 124–125
See application file for complete search history.

(56) References Cited

U.S. PATENT DOCUMENTS

| 6,289,114 | B1 * | 9/2001 | Mainguet | 382/124 |
|---|---|---|---|---|
| 7,099,496 | B2 * | 8/2006 | Benkley, III | 382/124 |
| 7,142,699 | B2 * | 11/2006 | Reisman et al. | 382/124 |
| 7,200,250 | B2 * | 4/2007 | Chou | 382/124 |
| 2002/0104957 | A1 * | 8/2002 | Liess et al. | 250/221 |
| 2003/0123714 | A1 | 7/2003 | O'Gorman et al. | |
| 2003/0156744 | A1 * | 8/2003 | Hashimoto | 382/124 |
| 2005/0084138 | A1 * | 4/2005 | Inkster et al. | 382/115 |

FOREIGN PATENT DOCUMENTS

| EP | 1 139 271 | 10/2001 |
|---|---|---|
| EP | 1139271 A2 * | 10/2001 |
| WO | WO 02/37410 | 5/2002 |

* cited by examiner

*Primary Examiner*—Matthew C Bella
*Assistant Examiner*—Eric Rush

(57) ABSTRACT

In a method and an arrangement for detecting skinprints, in particular fingerprints, it is provided that at least one strip sensor comprising at least one elongate narrow sensor line detects the structure of the fingertip when the fingertip passes over the strip sensor, that at least one optoelectronic speed sensor continuously determines the finger movement, that the fingertip is moved over at least one optoelectronic speed sensor and the strip sensor, and that the determined finger movement is used to correct an image of the finger structure that has been distorted as a result of non-uniform movement. Preferably, the speed sensor evaluates the Doppler shift of a modulation of the modulated laser light reflected at the moved finger surface.

12 Claims, 7 Drawing Sheets

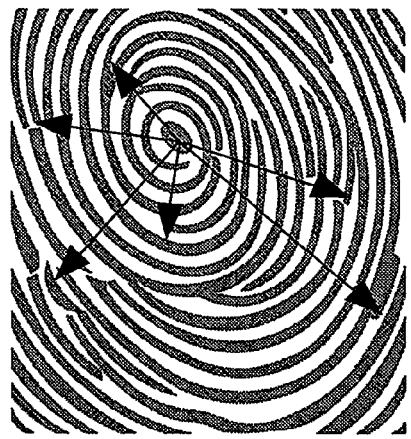 
FIG. 2a  FIG. 2c
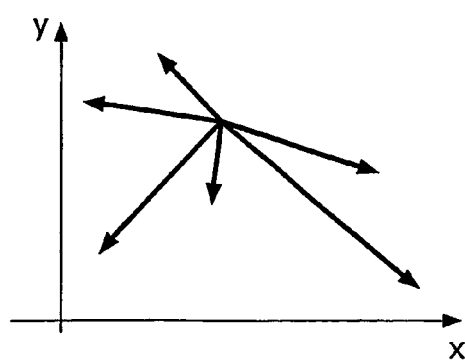 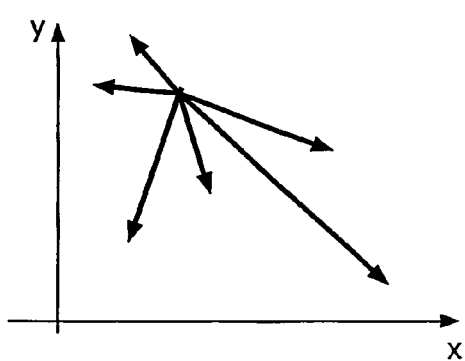
FIG. 2b  FIG. 2d

FINGERPRINT DETECTION USING SWEEP-TYPE IMAGER WITH OPTOELECTRONIC SPEED SENSOR

The invention relates to a method and arrangements for detecting skinprints, in particular fingerprints. The proposed arrangements are moreover particularly suitable for use as an input device. The input device may, for example, on electronic devices, perform operating functions, guide the cursor on a display or make selections within menus. Movement sequences that are carried out deliberately may be detected during the recording of the image and taken into account in the subsequent evaluation. By means of this additional feature, conceivable falsifications of fingerprints become much less of a problem.

The automatic identification of people by means of biometric features has become possible as a result of the availability of inexpensive computers. The costs of the components for recording the image of the fingerprint, also referred to as fingerprint sensors, are however extremely high.

Most of the fingerprint sensors commonly used can be divided into three groups:
1) sensors with optical projection
2) flat sensors or
3) strip sensors.

In the case of sensors with optical projection, the image is taken from a clear, transparent surface on which the fingertip bears, and is imaged in a chip camera in a manner reduced in size by optics. The surface of the chip camera is only a fraction of the size of the bearing area. The costs resulting from the semiconductor material are therefore relatively low, but the cost of the optics is high. Moreover, a sensor based on this principle requires a size of a few centimeters.

Most widely used are flat sensors which have an image recorder of the size of the fingertip, said image recorder being produced on the basis of a semiconductor substrate. Areas of between about 14×18 mm and 22×25 mm are required. Regardless of the imaging principle used (measurement of local capacitance effects, electrical field change or optical recording), a considerable fraction of the costs is caused solely by the necessary chip surface as a support for the recording elements (pixels). Calculated for mass use, these costs are for example much higher than those resulting today for image-evaluating microprocessors.

In the third group, only much smaller recording surfaces are required, since the image of the fingertip is recorded sequentially in lines. The user moves his finger over the recording line sensor, which detects the fingerprint line by line as the movement progresses. These sensors require only a narrow strip of 15×1 mm to 20×3 mm chip surface, that is to say only a fraction of the semiconductor material, and are thus much more cost-effective. In practice, however, they have the significant disadvantage that unusable distorted images are often produced. The main cause of this problem is the non-uniform movement of the finger. As a result, these sensors in practice have so many disadvantages that they often cannot be used.

It is therefore an object of the invention to achieve a low-distortion recording of images by means of strip sensors even when the finger movement does not take place with a constant speed and in a rectilinear direction. An attempt is thereby made to achieve the advantages of a strip sensor (cost, space) largely without the disadvantages thereof.

This object is achieved according to the invention in that
a) at least one strip sensor comprising at least one elongate narrow sensor line detects the structure of the fingertip when the fingertip passes over the strip sensor,
b) at least one optoelectronic speed sensor continuously determines the finger movement,
c) the fingertip is moved over at least one optoelectronic speed sensor and the strip sensor, and
d) the determined finger movement is used to correct an image of the finger structure that has been distorted as a result of non-uniform movement.

The correction may be applied to the detected image data of the distorted image itself. In one advantageous embodiment, however, computational complexity can be saved in that the correction is applied to a biometric data record derived from the distorted image.

In the method according to the invention, it is preferably provided that the optoelectronic speed sensor evaluates the Doppler shift of a modulation of the modulated laser light reflected at the moved finger surface. An optoelectronic speed sensor that can be used with particular advantage for this has been developed by Philips under the name "Laser Beetle" and is described for example in WO 02/37410 A1. As a "micro-mouse" it can be used for cursor guidance for computers. As a "trackball" it may also be used without mechanics for menu selection on device displays. As a very compact assembly, this device requires on the device surface only 10 to 25 mm$^2$ of space. An embodiment of 3 to 5 mm diameter is provided, which is similar to the size and structure of a conventional light-emitting diode.

This device can measure movements of the fingertip by means of laser light. The instantaneous speed of the fingertip in one or more directions on the device surface is determined. The fingertip moves on the upper side of a beveled raised area made of clear plastic or glass. By virtue of the beveled areas, a small movement component towards the bottom or the top occurs, that is to say in the direction of the laser light source or away from the latter. The skin of the fingertip is illuminated with coherent light from below. The reflected light waves are subjected to the Doppler effect as a function of the finger movement, so that the frequency and phase position of the reflected light shift slightly with respect to the emitted light. If emitted and reflected components of the light are fed into a light recorder, noting certain optical regularities, constructive and destructive interferences occur there.

If the emitted light is frequency-modulated as a linear chip, the device may be dimensioned such that very low frequency components in the highly detectable range of a few kHz are produced as a result of the Doppler effect and the interference. These frequencies are proportional to the speed of the finger in one direction. In order to detect the speeds for a number of directions, a number of detection systems may be joined together in an assembly. For instance, two orthogonal laser detection systems for example supply the Cartesian components of one speed vector.

Specifically, the method according to the invention may be designed such that in order to detect the finger movement
a) in a first movement phase firstly only part-regions of the fingertip pass over the strip sensor and are detected as images,
b) in one of the subsequent movement phases further regions of the fingertip pass over the strip sensor and are detected as images, and
c) these movement phases have considerably different directions and/or are separated by intermediate movement phases of considerably different directions, at least part of the spatial allocation of the image information taking place when the image is constructed through the detected finger movement in the movement phases.

A further increase in the reliability of the method according to the invention consists in that the determined involuntary finger movement is used as an additional feature besides the biometric features of the fingertip for identifying persons. These involuntary finger movements may be typical for one person.

Another development likewise helps to increase the reliability, said development consisting in that a) a movement sequence takes place such that b) the same regions of the fingertip pass over the strip sensor a number of times and are detected as images, and c) the image information detected a number of times for one region is taken into account for image improvement purposes, at least part of the spatial allocation of the image information taking place through the detected movement sequence.

One fundamental problem of automatic identification by means of biometric features is that the conveniently manipulable features can rarely be kept secret. They may in principle be acquired by anyone. For instance, with a little organization it is possible for fingerprints to be removed from everyday objects without the person noticing.

Using this information, with a little technical effort it is possible to make good enough imitations to produce acceptable images using most fingerprint recorders. Imitations made of silicone rubber or gelatins have become known, which lead to identification at automatic detection systems.

In the case of a so-called "living person identification", besides the upper skin structure additional features should be included in the biometric identification, which are intended to distinguish an imitation from a living finger. However, the situation can rarely be ruled out whereby with increased effort it is possible to copy most of the features in question, for example by pulling a film-like imitation of a foreign skin structure over a living finger.

These imitation possibilities are ruled out in a further development in that the finger movement is carried out by the user with a characteristic sequence of movements, and in that the determined finger movement is compared with a stored finger movement. This provides an input possibility which can be used in various ways. For instance, it may be provided that the stored finger movement is typical for the user and the user is thus identified. An inputting of a movement feature by the user is thus carried out, this being checked by comparing it with a stored finger movement in real time. It is particularly advantageous that this movement feature cannot adhere to a fingerprint removed from any surface by the forger.

In the further development it may also be provided that the detecting unit is switched into various operating states by different results during the detection of the finger movement.

In principle, in the method according to the invention it is possible to complete both the scanning of the finger by the strip sensor and the determination of the finger movement and then—where necessary after image processing—to carry out the correction. However, in the method according to the invention it may also be provided that the passing over of a settable movement distance determined by the speed sensor triggers image detection of a new line by the strip sensor. The newly read line can then be corrected at least with respect to its errors occurring in the line direction in accordance with the determined finger movement.

One advantageous possibility for geometric correction of the overall image or even individual lines is that the address of an image point for storing the image of the fingerprint in a storage medium depends on the determined finger movement.

One further advantageous possibility for correcting the image consists in that the determined finger movement is used to calculate and/or select the coefficients of non-symmetrical, orientation-selective spatial filters, and in that the spatial filters perform corrections of the movement directions during processing of the image.

Finally, in order to correct the image it is possible that the determined finger movement is used to calculate and/or select the coefficients of spatial filters, and in that the spatial filters perform corrections of the different movement distances during processing of the finger image.

By means of a movement sensor, it is possible to determine translational movements of a finger, deformation of which resulting from being placed or moved on the detection system can be ignored within the tolerances of the biometric method. Rotational movements and deformations of the finger can be detected by means of one development of the method which consists in that the finger movement is determined simultaneously on various part-surfaces of the fingertip, and in that a proportional rotary movement (rotation) in the plane of image recording is calculated therefrom, or in that movement information from various part-surfaces of the fingertip is determined simultaneously and taken into account separately for the part-surfaces.

In these developments it may also be provided that the finger movement of various part-surfaces of the fingertip is determined simultaneously and an excessively highly pronounced deformation and/or a measurement error is identified when the determined finger movements of the part-surfaces differ considerably from those which would be possible as a result of a rotation and/or displacement with plausible parameters.

One advantageous transformation for correction of the image comprises the following steps:

a) conversion of the positions of the image points from a representation that is not necessarily equidistant on account of non-uniform movement to a spatially highly resolved representation (oversampling) and in accordance with spatial filtering with low-pass effect, and b) conversion into a representation that is reduced again but reliably equidistant (resampling).

One expansion of the use possibilities of the method according to the invention consists in that the laser light emitted by the speed sensor and reflected is furthermore used to determine chemical properties from the color line spectrum of the light component reflected by the finger. It is thus possible, for example, to distinguish between a living finger and a copy by a determination of the concentration of dissolved and bound gases in the blood—such as the blood oxygen content or carbon dioxide content—being carried out.

One advantageous arrangement for detecting skinprints, in particular fingerprints, consists in that at least one optoelectronic speed sensor is located within at most a few millimeters of a strip sensor and on a surface at a point provided for detecting the fingerprint. It is preferably provided that at least one optoelectronic speed sensor and the strip sensor form a compact assembly.

Besides the function of detecting skinprints, in the arrangement according to the invention it may also be provided that at least one optoelectronic speed sensor is used at the same time as an input device for operating functions and/or that a light source of the optoelectronic speed sensor is at the same time an illumination device of the speed sensor.

Furthermore, the arrangement according to the invention may also be designed such that the light source of the optoelectronic speed sensor is used at the same time as a device for outputting signals to the user.

Finally, in the arrangement according to the invention it may be provided that the optoelectronic speed sensor and the strip sensor are applied to elastic support material, as a result of which a finger bearing surface formed by the support material is flexible at least in the transverse direction with respect to the strip sensor. The arrangement according to the invention thus adapts to the curvature of the finger so that the latter is not significantly deformed during use of the arrangement.

The identification of a legitimate user is frequently necessary in the case of mobile devices. Moreover, in communication networks it may be important for identification of the user to take place at mobile terminals. In one development of the arrangement according to the invention, therefore, it is provided that it is part of a device for mobile communication.

In many applications, a fixed arrangement is preferably provided, over the surface of which the finger is moved. If it is advantageous, the arrangement according to the invention may also be designed such that it can be guided over the surface of body parts for the purpose of detecting skinprints.

The following explanations serve for a better understanding of the invention. If the relative movement of the finger with respect to the detecting line sensor is considered, it can be broken down as a model into the following components:

1) translation of the overall tip, for example with components
   in a direction x (perpendicular to the line sensor)
   and in a direction y (and in the direction of the line)
2) rotation(s) of the overall tip, in each case describable by
   a speed of rotation (value and direction)
   and a point of rotation, which may in some circumstances
      be continuously displaced
3) complicated movement components as a result of elastic deformations of the fingertip, which may be different for part-surfaces of the fingertip
   for example as a result of
   pressing of the round finger shape on a flat surface or
   acceleration and friction forces on the surface
4) other movement components and measurement errors.

The movements are detected as a sequence of steps that are separate in time, wherein one step may advantageously be equated to the time taken to detect one line. On account of the linear connection between speed, time and distance, the determination of the part-distances of the movement for each of the steps from the speed measurement is trivial. The time spans for line recording and possibly times between the recordings are precisely known.

The distance traveled by the finger over the speed sensor during one step can be calculated by integrating the measured speed over time beginning with the end of the detection of one line to the end of the detection of the next line.

Since in the case of the abovementioned optoelectronic speed sensor the speed is derived from a frequency of a sinusoidal electrical signal, a specific—very small—distance is always traveled when a fixed phase position of the signal is repeated. The zero crossing is easily detectable as the phase position. If the signal is largely free of interference, the zero crossings of the signal can be counted directly. The counter status is proportional to the distance traveled.

The translational components of the movement are described as a displacement vector for each recording step, that is to say for each image line. The vector may be detected directly in its Cartesian components, and the x direction may in this case lie transversely with respect to the strip sensor. The y direction then lies in the direction of the line of the strip sensor.

As an ideal setting for a scan operation it would be desirable to keep the speed in the x direction completely constant during the recording of an image. Moreover, for each image recording it would be desirable for the same speed to be repeated each time. Equidistant and repeatable sizes of the pixels in the x dimension are therefore produced.

Ideally, there should be no displacements in the y direction, that is to say the speed with the value zero should always be detected. The sizes of the line pixels are then to be used as the width of the image elements, and the arrangement from the line can be performed directly during storing of the image. The stable positioning in the y direction (=zero movement) is in some strip sensors aided by an elongate depression or guide in the x direction. This may have only a limited effect inter alia on account of fingers of different size. As already mentioned, it is rarely enough for people to approximate this uniform ideal movement.

The model of translation movement or of the translational component of a complicated overall movement classifies the same translation vector for each image point recorded at the same time. That is to say, for any given line a vector is to be allocated and possibly stored. The vector is to be taken into account additively for a correction.

If, then, the model of the movement is assumed to be reduced to a translation, one speed measurement in the x direction and one in the y direction are sufficient. In a simplified variant, it is even possible for one of the two directions to be omitted.

For measurement technology reasons, provision may also be made for the vector components of the detection to be designed such that they have the same value in the case of an ideal movement. For instance, orthogonal components could be rotated 45 to 135 degrees counter to the line direction. Oblique-angled coordinate systems are also possible, these having in each case the same angle value counter to the line direction in order to detect the various-size movements transversely to and along the line with more favorable measurement errors.

In one simple scan operation, ideally no rotation movements should occur during image detection.

As the rotational components of the movement, only those which lie in the plane of the strip sensor and the device surface should be taken into account. All the other rotational components are added to the other movement components and as such generally ignored. As a result of the rotations, the starting point is assumed to be an angular movement. The angle may change for each line in terms of its value and sign. To complicate matters, it is to be assumed that the point of rotation (rotation centre point) is displaced continuously on the sensor plane. It is moreover assumed, in a simplifying manner, that the point of rotation can be kept for a discrete time step.

In order to describe the rotational movement component, each recorded line can be assigned a pair of rotation angle and rotation centre point. Another mathematical description form is the rotation matrix and a displacement vector. If the rotation is to be taken into account along with the translation, at least two speed sensors with in each case two directional components are to be provided. Moreover, assumptions and framework conditions are to be set, such as, for example, plausible limitations of the rotation angle and of the position of the point of rotation, or the assumption that the movement first consists predominantly of translational components and only the remaining differences of the measured values are to be regarded as rotation.

A rotation in addition to the translation is simpler to take into account if there are more than two speed sensors. The equation system that is to be solved is then determined from rotation matrix and displacement vector or even overdetermined. In the overdetermined case, however, an error treatment of the movement values with measurement errors must be carried out.

The movement components of the deformation are not to be modeled in a completely closed manner. Thus, the deformation can lead to movements at the edge of the tip that are directed upwards to varying extents, as a result of the round fingertip being pressed to varying extents on a flat surface.

The translation of the finger, in the case of weak pressing with low friction, causes a relatively uniform running of the surface of the skin. In the case of more pronounced pressing, however, first the spring elasticity of the tissue is stressed as a result of the continuing friction forces, that is to say it follows the upper skin only after a certain expansion of the translation of the overall finger. Although these effects as a result of different pressing are geometrically small, they do exceed the order of magnitude of the detected image elements (pixels).

A rotation of a forcefully pressed finger may lead to friction forces directed at a tangent in the opposite direction, by means of which slightly spiral distortions occur. It is difficult for deformations to be taken into account. The determination of a correction as a projection onto an elliptical or hyperbolic surface is very complicated. It can be calculated via projection matrices but the determination of the matrices is difficult.

It is therefore proposed to simplify the treatment of deformations such that different translation movements (and possibly also slightly different rotation movements) are assumed of part-regions of the fingertip, these being detected independently of each other using a number of speed sensors and in each case being taken into account differently in the image correction.

Another procedure in practice may be to dispense with the correction of deformations. Instead, it is merely determined whether the extent of the overall deformation lies above or below a threshold. In the manner of a quality criterion, a distinction should be made between acceptable and unacceptable detection processes. An index for great deformations is present when the parameters of the speed sensors for a translation and/or a rotation reach implausible values or value ratios. For this, at least two speed sensors are required.

By way of example, a considerable movement of two speed sensors towards one another is relatively implausible for a translation or rotation. However, measurement errors may also cause such phenomena as deformations. On account of the very probably problematic image quality in both cases, it is proposed that the detection process be repeated.

A rolling or tilting movement with a point of rotation outside the plane of the strip sensor and the device surface is likewise caused by the human joint system. It is undesirable for ideal image recording. The rolling movement can only be detected by means of a number of strip sensors, and is mainly expressed by translational and rotational components. The movement parameters themselves can largely be calculated and estimated from the values of a number of speed sensors, but the values are superposed by changing deformation components caused by the rolling that can only be detected with difficulty.

It is moreover to be assumed that the movements and deformations of cold, moist or greasy fingers differ slightly. It is usually difficult for these other causes to be taken into account in movement models. Procedures such as in the case of deformation are advised. However, these movements with other causes can be found to considerable extents in the translation vectors, the rotation parameters and, if these are taken into account, also in the correctable deformations.

The suitability of the line or strip sensors is according to the invention improved in that the undesired, usually non-uniform movement components are corrected.

This correction may take place by processing steps following image detection or as part of the detection process. One particularly computing power-saving variant is to apply the correction steps only once the biometric features have been determined, that is to say to the much smaller number of spatial information items of the features in the biometric data record (template). An intermediate stage between applying the correction to the raw image and to the biometric data record is to apply it to a vectorial representation of the fingerprint. The vectorial correction may take place at the processing stage of vectorization of the finger structures. The vectorization is provided in a few processing algorithms.

Firstly, the correction which takes place after image detection of the entire image is discussed. With each line detected equidistantly over time, one movement vector is detected for each speed sensor. It may be defined relative to the previous line or integrated over all the previous lines. If only one speed sensor is used, this vector is added to the coordinates of the image points of the line. When relating the vector to the previous line, the correction of this line is included. The distance in the x direction which is traveled in the case of an ideally recorded image is then, however, subtracted vectorially beforehand.

In the case of a number of speed sensors, a rotation matrix can be determined in addition to the abovementioned translation vector. While this vector is added, a matrix vector multiplication of the rotation matrix with the non-corrected vector of an image point is carried out beforehand. The result of this multiplication and addition is the corrected vector of the image point. In this case, too, the same rotation matrix is used for an entire line. The rotation matrix in one plane has the dimensions 2×2 values, which are not free but rather depend on the parameters rotation angle and center point. In order to determine the rotation matrices and translation vectors, an equation system is solved using the movement values of the speed sensor.

By means of interpolation calculations it is possible for disruptive effects of a non-uniform discretization of the movement components to be attenuated. For this purpose there is proposed the use of oversampling of the original image, the use of spatial filters and a so-called resampling in the original resolution. Symmetrical folding matrices (or else image filter matrices) are often used for spatial filters.

At this point, it is advantageously possible to use matrices with unsymmetrical pronounced coefficients, the asymmetry of which corrects and interpolates, in a compensating manner, the movement in one calculation step.

A projective rectification by multiplication for each line or some lines combined with a dedicated projection matrix is also possible. For this purpose, a number of speed information items from different locations are always required.

The measured movement may also take place immediately after detection of a line. This can be used in particular in order to take account of translation. If the movement along the strip sensor exceeds one pixel, for example the data of the line can be displaced by the movement (calculated in pixels). This may be effected by address calculation of the memory for the line or in connection with a serial displacement for reading the lines.

The direction transverse to the strip sensor may be influenced by controlling the detection time for a line and in particular the waiting time between line detections. These times may be controlled such that the detection takes place in a substantially equidistant manner. The measurement of the movement makes it possible always to record a new line when a certain distance has been traveled. In this case, the time required—which is dependent on the movement speed—no longer has any influence on when implausible times are exceeded or undershot.

With a very precisely measured movement sequence it is possible to improve the image of the fingerprint when the locations on the fingertip are detected a number of times via the line sensor. For this purpose, an uninterrupted movement is to be carried out, for example a multiple forward and backward movement of the finger. The precise following of the movement allows a very precise allocation of the geometric location and otherwise corresponds to detecting the image a number of times, which reduces all kinds of scattering image errors. The procedure may be carried out in a similar manner when large, wide fingertips are conventionally imaged only incompletely by narrow strip sensors. In this case, the image may be supplemented by multiple movements.

The laser light may be used for illumination purposes for a line sensor which is based on optical detection principles. The scattered light in particular can illuminate the fingertip well. In the case of a number of laser diodes, these may in time multiplex operation produce different illumination angles against the finger. The images may exhibit good contrast on account of the alternating shadow. A number of laser diodes can be used for multicolor illumination or for illuminating with specific exciting frequencies, and as a result it is possible to deduce a number of chemical properties of the material applied. For example, the blood oxygen content can be determined, which can act as a limited index against imitation.

One ergonomic advantage in the case of visible laser light is the clear optical marking of the input point and possibly signaling, for example by means of visible flashing or pulsing.

In order to illustrate the large number of potential applications, a few fields of application are listed:

Computer access in combination with operating elements is one obvious application of the proposed solutions. Particular advantages are obtained for future mobile telephones with numerous additional functions and services, handheld computers with communication and notebook functions (PDAs). Further applications include access and electronic operating functions for a motor vehicle. An electronic car key or an access token can be activated and possibly also operated by a fingerprint. Payment functions may be controlled by systems of the proposed type.

Cash machines, POS systems, safes, access controls by means of door locks, turnstiles, clocking-in terminals and public bank terminals may be equipped with the solutions according to the invention. Medical devices with critical operating processes require a safety mechanism so that only particularly authorized people can initiate these critical processes. The solutions according to the invention can be used for this. The same type of thing is also useful in some cases in aircraft and motor vehicles, machines and systems. This applies not only in respect of operation but also in respect of the maintenance and calibration and setting of parameters. By means of the combination of input system and finger detection, a protocolling of particular operating functions with automatic identification of the operating person is possible. For instance, a stock market computer could connect a transaction order with a person as evidence. The person-associated securing of sports and hunting weapons and similar dangerous items, tools and machines is possible.

Particular application advantages are obtained in the case of highly cost-sensitive products and in the case of highly restricted space conditions.

The invention will be further described with reference to examples of embodiments shown in the drawings to which, however, the invention is not restricted.

FIG. 2 shows the distortions of the biometric features.

FIG. 1 shows an example of embodiment comprising a line sensor or strip sensor (1) and an optoelectronic speed sensor (2)—of which only the part projecting out of the device housing (4) can be seen here. A finger (3) is placed with its tip under a slight pressing pressure on the surface of the housing (4) and drawn over the speed sensor (2) and the line or strip sensor (1).

A regular image with orthogonally equidistant image points is produced only if a rectilinear movement with a reproducible and constant speed takes place transversely with respect to the strip sensor. This can only be approximated to a limited extent by the finger movement. Instead, a somewhat curved, non-uniform movement (5) of varying speed is typical.

FIGS. 2a to 2c illustrate the distortions of the image and hence of the biometric features on account of the non-uniform movement. FIG. 2a shows a non-distorted fingerprint, as would be supplied by a very good flat sensor for example. By way of example, arrows from the center of the structures (core) point to a few selected features (minutiae) which are decisive in the biometric identification.

In FIG. 2b, the geometric relations of these features are shown as vector arrows against a coordinate system. FIG. 2c shows the image of the same fingerprint in the same orientation as FIG. 2a. However, it has now undergone massive distortions. Such distortions arise on account of the causes already discussed, primarily by the non-uniform movements of the finger in the case of a line sensor. The selected features (minutiae) are once again shown by arrows.

FIG. 2d shows the geometric relations of these features as vector arrows. Comparing this to FIG. 2b shows that there is a much different geometric position of the features. A detection process can accept the deviations as identical only when it is set with particularly tolerant parameters. However, a high tolerance also leads to incorrect identification of other people.

Figure 1:
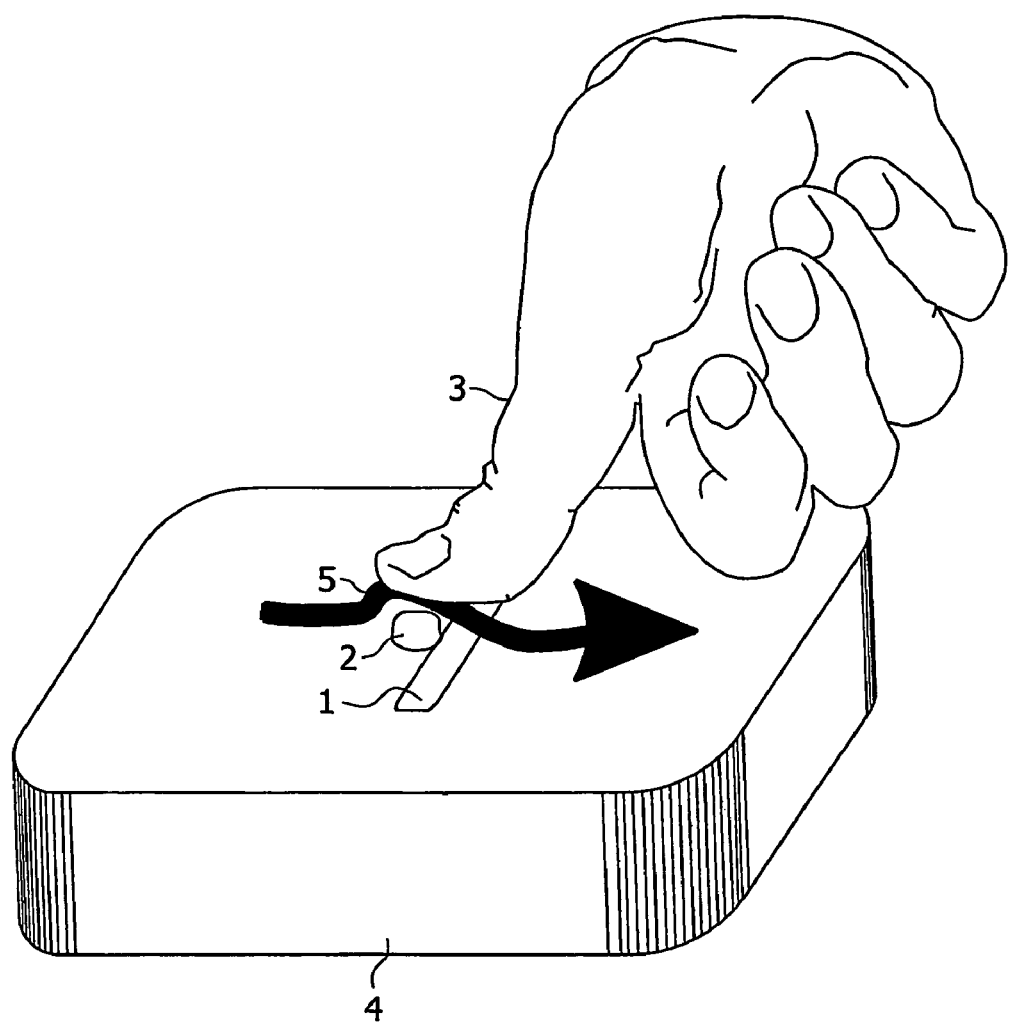
FIG. 1 shows a first example of embodiment.
Figure 3A:
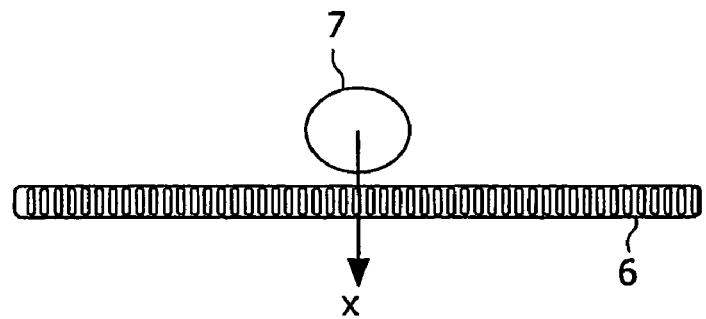
FIG. 3 shows further examples of embodiments with various arrangements of the components.

FIGS. 3a to 3i show examples of the arrangement of the components strip sensor (6) and speed sensor (7). Specifically:

FIG. 3a shows a simple speed sensor (7) which detects only the speed component (here designated x) transverse to the strip sensor (6). It is therefore the main component of the finger movement during the detection. By means of such an arrangement it is possible for example for the time of line recording to be controlled as a function of the distance.

Figure 3B:
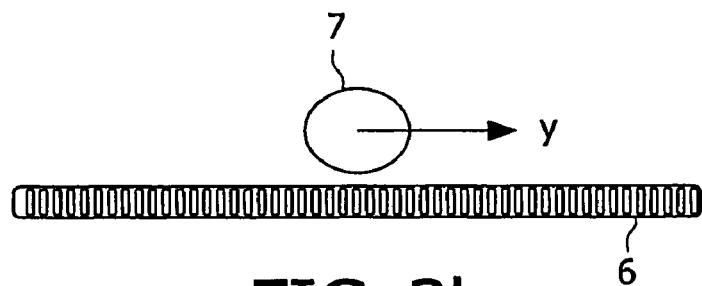

FIG. 3b shows a speed sensor (7) which detects only the speed component (here designated y) along the strip sensor (6). In the ideal detection process it should be close to zero. If the movement exceeds a pixel width of the strip sensor (6), the data of the line may for example be displaced in terms of the movement by the corresponding number of pixels.

Figure 3C:
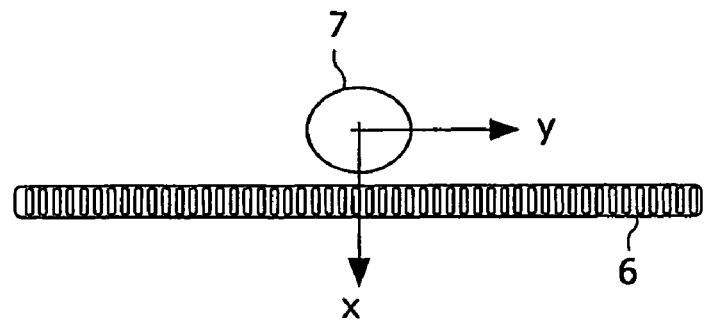

FIG. 3c shows a speed sensor (7) which detects the speed component transverse to (x) and along (y) the strip sensor (6). The translation movement can thereby be measured.

Figure 3D:
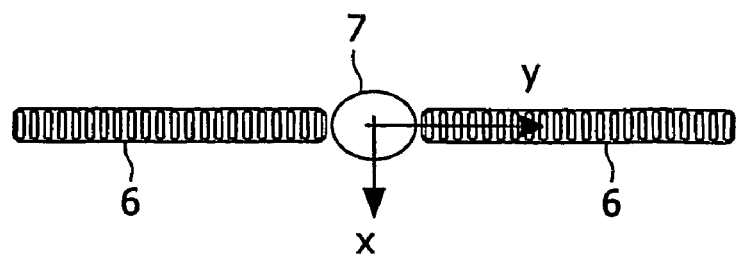

FIG. 3d shows a speed sensor (7) which detects the speed component transverse to (x) and along (y) the strip sensor (6). By means of the position of the speed sensor (7) in the center between two strip sensors (6), the image and speed detection takes place from the same position with respect to the finger, that is to say predominantly with less error and over the same contact period.

The speed sensor (7) may moreover form a tangible aid to finger positioning by means of a raised area or depression. If a number of line sensors are used next to one another, these may advantageously be designed to be smaller in each case. By using a number of strip sensors (6) it is possible to detect wider areas of large fingertips. The image strip falling in the center through the break in the strip sensor leads only to the omission of a few biometric features that are redundant anyway.

Figure 3E:
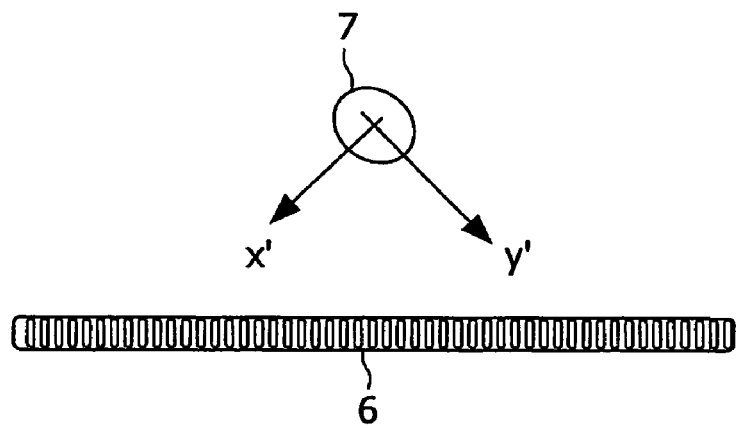

FIG. 3e shows a speed sensor (7) which detects the speed components (x' and y') diagonal to the image and at an angle to the strip sensor (6). The angle of the speed components is in this case selected to be the same size but with different orientation.

Usually, speed sensors are produced with orthogonal recording components so that angles of 45 degrees to the strip sensor (6) are produced. The decisive advantage in this case is that given a practically ideal movement the components of the speed and the measurement technology error ranges are the same size. The translation movement can thereby be detected.

Figure 3F:
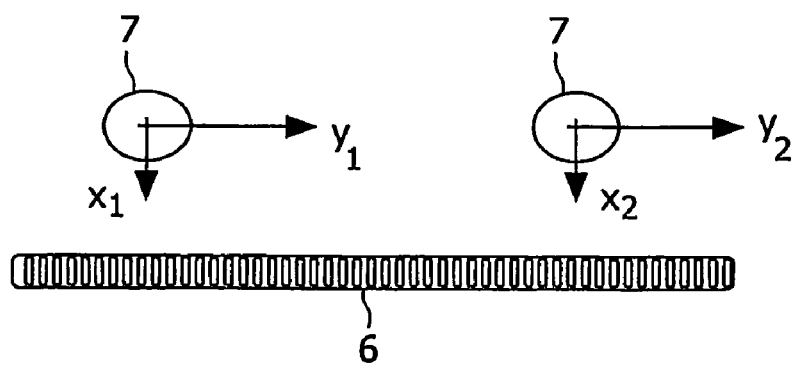

FIG. 3f shows an arrangement of two speed sensors (7) which in each case detect the speed components transverse to $(x_1, x_2)$ and along $(y_1, y_2)$ the strip sensor (6). The translation movement and the rotation can thereby be detected—by various values of the speed sensor. If the results deviate from plausible values, there is a measurement error or a great deformation of the finger tissue.

Figure 3G:
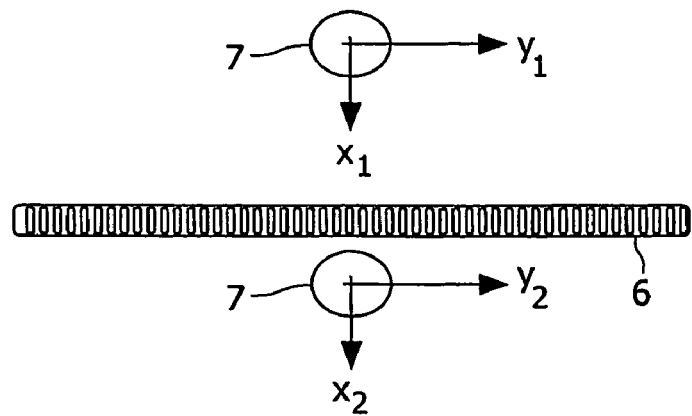

FIG. 3g—This arrangement is comparable with FIG. 3f, but the translation can be measured by at least one of the speed sensors shortly before and also shortly after contacting of the strip sensor (6). The detected lines are therefore continuously to be provided with a speed even at the lower image start and at the upper end of the image.

Figure 3H:
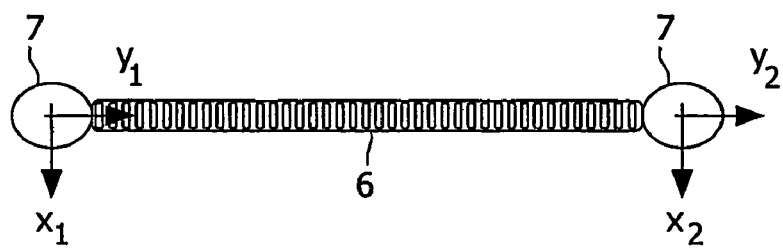

FIG. 3h—This arrangement too is comparable with FIG. 3f, but in this case the speed sensors (7) lie at the ends of the strip sensors (6). The arrangement has the advantage of the same position of the strip sensor and of the speed sensor in the main direction of movement. However, narrow fingertips can only be detected by the two speed sensors (7) in the case of a short strip sensor (6). Short line sensors in turn supply little information in the case of large fingers. However, this may be compensated to a limited extent by a multiple movement proposed within the context of the invention.

Figure 3I:
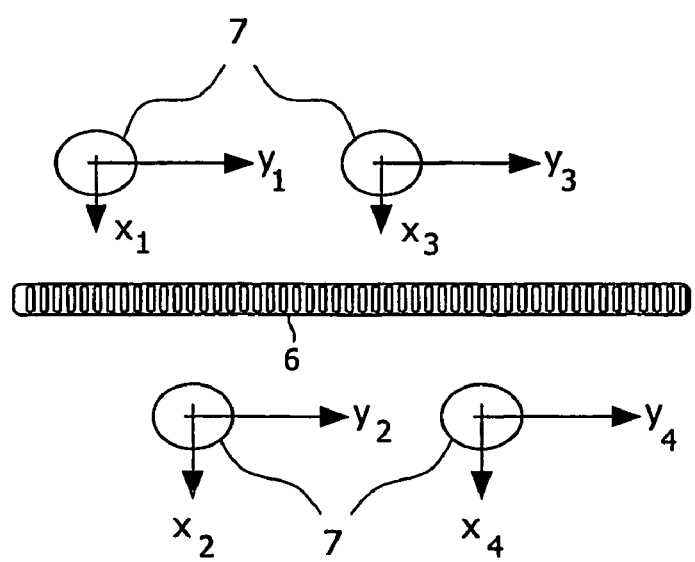

FIG. 3i—With the aid of more than two speed sensors (7), it is also possible to deal with deformations, discussed above. The offset arrangement above and below the strip sensor (6) has the advantage that, given a practically ideal movement for each speed sensor (7), other parts of the fingertip undergo the speed measurement.

Figure 4A:
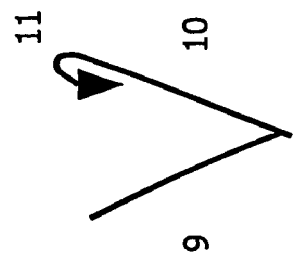
FIG. 4 shows the possibility of using characteristic movement sequences as an additional feature to prevent imitations.
Figure 4B:
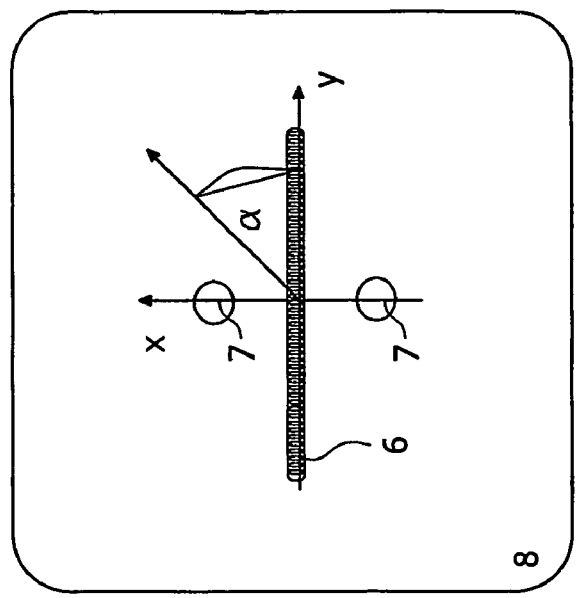
Figure 4C:
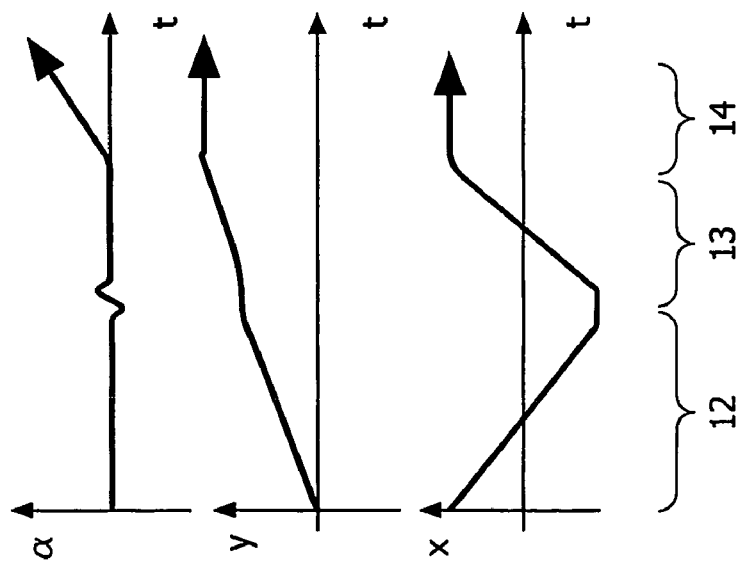

FIGS. 4a to 4c show as an example one characteristic movement sequence which may be used as an additional feature besides biometric identification.

FIG. 4a shows as an example successive part-movements. In the first movement section (9), the finger movement is directed downward and slightly to the right. This is then followed by the second movement section (10). Here, the finger movement is directed upwards and slightly to the right. In the final, third movement section (11), the finger is not displaced but rather a finger rotation is carried out approximately 180 degrees in the counter-clockwise direction.

FIG. 4b shows a device upper side (8) with two speed sensors (7) and one line sensor. This shows a reference coordinate system (x,y,a) corresponding to the examples shown in FIGS. 4a and 4c.

FIG. 4c shows the course of the vector components (x,y) and of the rotation angle a during the characteristic movement. These variables are shown as a function of time in three diagrams. The period of the first movement section (12) is distinguished by a sharp drop in the x component, a small rise in the y component but no change to the angle of rotation. In the period of the second movement section (13) the sharp rise in the x component, another small rise in the y component and once again no change to the angle of rotation are observed. The period of the third movement section (14) is characterized by no change in the x and y components. However, the angle of rotation increases sharply.

Figure 5A:
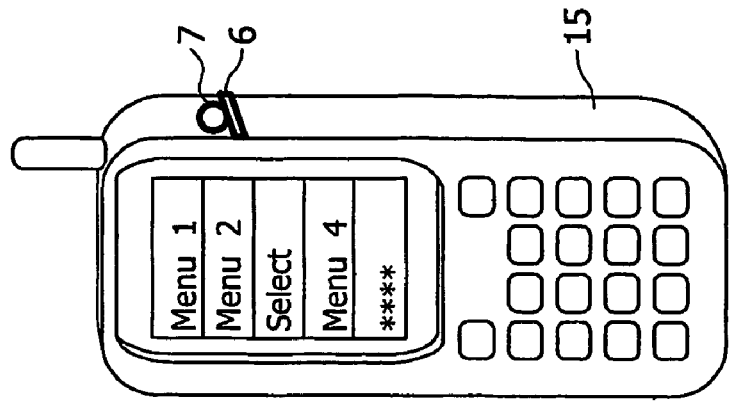
FIG. 5 shows two application examples.
Figure 5B:
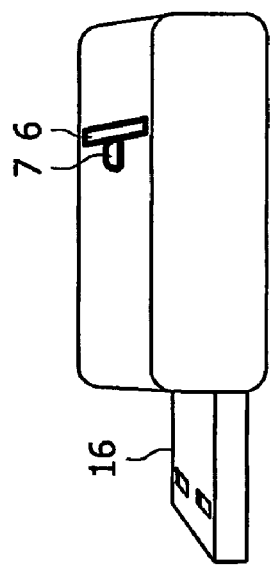

FIGS. 5a and 5b show two applications. The solution according to the invention can be used very advantageously in a mobile telephone (15). In a space-saving unit, the speed sensor (7) and the line sensor (6) are placed on the front side or laterally on the housing. This unit is at the same time an input component for menu control and for the identification system.

A further example is a small authentication device which is activated by the relevant fingerprint. Here, a so-called token (16) with a USB interface is shown, which may be used for PC systems for access control.

The invention claimed is:

1. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein a movement sequence takes place such that the same regions of the fingertip pass over the strip sensor a number of times and are detected as images, and the image information detected a number of times for one region is taken into account for image improvement purposes, at least part of the spatial allocation of the image information taking place through the detected movement sequence.

2. A method as claimed in claim 1, characterized in that the finger movement is carried out by a user with a characteristic sequence of movements, and in that the determined finger movement is compared with a stored finger movement.

3. A method as claimed in claim 2, characterized in that the stored finger movement is typical for the user and the user is thus identified.

4. A method as claimed in claim 2, characterized in that a detecting unit is switched into various operating states by different results during the detection of the finger movement.

5. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein the determined finger movement is used to determine, via at least one of calculation and selection, the coefficients of non-symmetrical, orientation-selective spatial filters, and wherein the spatial filters are used to perform corrections of the movement directions during processing of the image.

6. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein the determined finger movement is used to determine, via at least one of calculation and selection, the coefficients of spatial filters, and wherein the spatial filters are used to perform corrections of the different movement distances during processing of the finger image.

7. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein finger movement is determined simultaneously on various part-surfaces of the fingertip, and wherein a proportional rotary movement in that plane of image recording is calculated therefrom.

8. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein-movement information from various part-surfaces of the fingertip is determined simultaneously and taken into account separately for the part-surfaces.

9. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein the finger movement of various part-surfaces of the fingertip is determined simultaneously and an excessively highly pronounced deformation and/or a measurement error is identified when the determined finger movements of the part-surfaces differ considerably from those which would be possible as a result of a rotation and/or displacement with plausible parameters.

10. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein the correction of the image by means of the determined finger movement comprises the following part-calculations: conversion of the positions of the image points from a representation that is not necessarily equidistant on account of non-uniform movement to a spatially highly resolved representation and in accordance with spatial filtering with low-pass effect, and conversion into a representation that is reduced again but reliably equidistant.

11. A method of detecting skinprints, in particular fingerprints, characterized in that at least one strip sensor comprising at least one elongate narrow sensor line detects the structure of the fingertip when the fingertip passes over the strip sensor, at least one optoelectronic speed sensor continuously determines finger movement, the fingertip is moved over at least one optoelectronic speed sensor and the strip sensor, and the determined finger movement is used to correct an image of the finger structure that has been distorted as a result of non-uniform movement, wherein laser light emitted by the speed sensor and reflected is used to determine chemical properties from the color line spectrum of the light component reflected by the finger.

12. A method as claimed in claim 11, characterized in that a determination of the concentration of dissolved and bound gases in the blood, including blood oxygen content or carbon dioxide content, is carried out.

* * * * *